Figure 1:
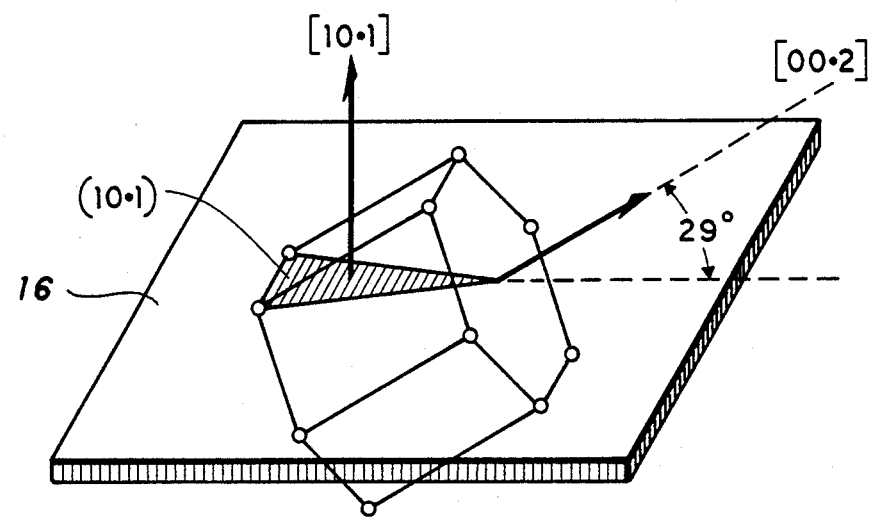

United States Patent [19]

Brucker et al.

[11] Patent Number: 4,902,583

[45] Date of Patent: Feb. 20, 1990

[54] THICK DEPOSITED COBALT PLATINUM MAGNETIC FILM AND METHOD OF FABRICATION THEREOF

[76] Inventors: Charles F. Brucker; Frederick E. Spada, both of 3985 Sorrento Valley Blvd., San Diego, Calif. 92121

[21] Appl. No.: 319,597

[22] Filed: Mar. 6, 1989

[51] Int. Cl.$^4$ .................. H01F 10/16; H01F 41/18; C23C 14/34; G11B 5/64

[52] U.S. Cl. ............................... 428/665; 428/667; 428/668; 428/928; 204/192.2

[58] Field of Search .............. 428/928, 668, 665, 666, 428/664, 661, 670, 667, 611; 204/192.2

[56] References Cited

U.S. PATENT DOCUMENTS

| | | | |
|---|---|---|---|
| 4,438,066 | 3/1984 | Aboat et al. | 420/435 |
| 4,631,202 | 12/1986 | Opfer et al. | 427/131 |
| 4,652,499 | 3/1987 | Howard | 428/928 |
| 4,654,276 | 3/1987 | Ahlert et al. | 428/641 |
| 4,678,721 | 7/1987 | den Broeder et al. | 428/668 |
| 4,749,459 | 6/1988 | Yamasuita et al. | 204/192.2 |
| 4,749,628 | 6/1988 | Ahlert et al. | 428/928 |
| 4,786,564 | 11/1988 | Chen et al. | 428/928 |
| 4,789,598 | 12/1988 | Howard et al. | 428/928 |

FOREIGN PATENT DOCUMENTS

3203918A1  9/1982  Fed. Rep. of Germany ... 204/192.2

OTHER PUBLICATIONS

D. Treves et al., "Platinum–Cobalt Films for Digital Magneto-Optical Recording", Journal of Applied Physics, vol. 46, No. 6, Jun. 1975, pp 2760–2765.

M. Yanagisawa et al., "Corrosion-Resisting Co-Pt Thin Film Medium for High Density Recording", IEEE Transactions on Magnetics, vol. Mag-19, No. 5, Sep. 1983, pp 1638–1640.

Primary Examiner—John J. Zimmerman

[57] ABSTRACT

A 3,000–10,000 angstrom thick cobalt-platinum (CoPt) magnetic film is deposited onto a chromium (Cr) or tungsten (W) overlayer on a substrate, or is deposited directly onto the substrate. The deposited film has an appreciable component of its C-axis, which is parallel to the [00.2] direction, lying in the plane of the film. The component of the C-axis lies in the plane of the film throughout the entire thickness of the CoPt film, and the resultant magnetic film has a coercivity from 1,300–2,000 oersteds, depending upon which, if any, overlayer is included.

The method for producing the magnetic film of the invention teaches sputtering the overlayer onto a substrate maintained approximately at room temperature in an atmosphere of inert gas. After ajdusting the pressure of the gas and controlling the distance between the CoPt sputtering target and the substrate, CoPt is sputtered such that the depositing Co and Pt atoms are thermalized while traversing the distance between the target and the substrate.

The film as deposited is magnetically isotropic in the plane, and may configured as a permanent magnet having a resultant magnetization in the plane by exposure to an external magnetizing field oriented along the film plane.

13 Claims, 4 Drawing Sheets

THICK DEPOSITED COBALT PLATINUM MAGNETIC FILM AND METHOD OF FABRICATION THEREOF

BACKGROUND OF THE INVENTION

1. Field of the Invention

This invention relates to a cobalt platinum (CoPt) deposited magnetic film, and in particular, to a CoPt deposited magnetic film of thickness from 3,000 to 10,000 angstroms having a coercivity from 1,300–2,000 oersteds, and to the method of depositing such a magnetic film.

2. Description Relative to the Prior Art

Following the practice of the crystallographic art, a crystal plane is identified by indices enclosed in parentheses, e.g. (10.1), and direction in a crystal is represented by indices enclosed in brackets, e.g. [00.2].

Figure 2:
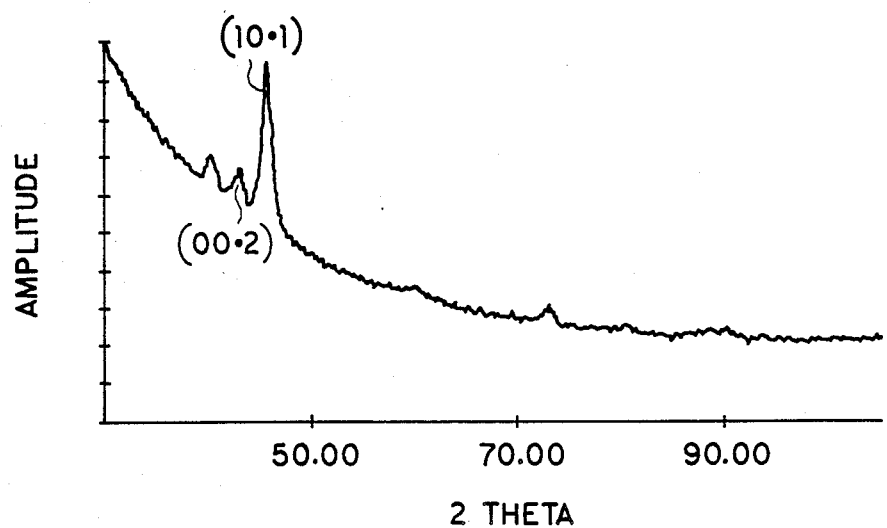
Figure 3:
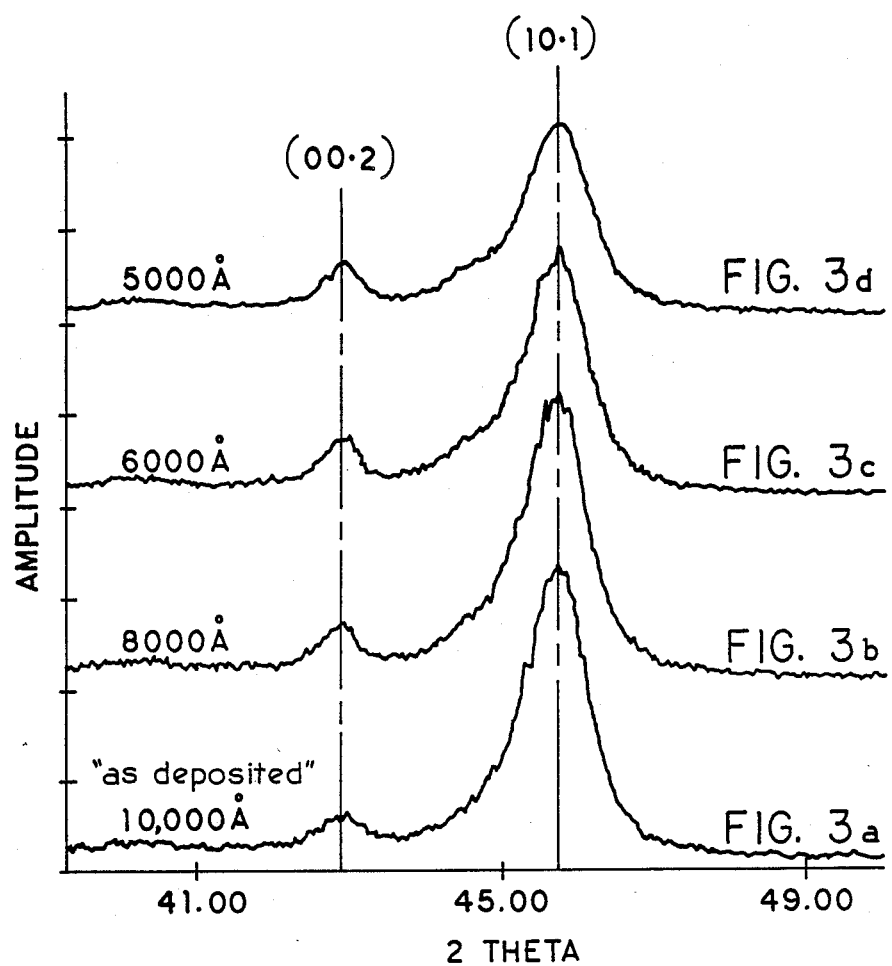
Figure 4:
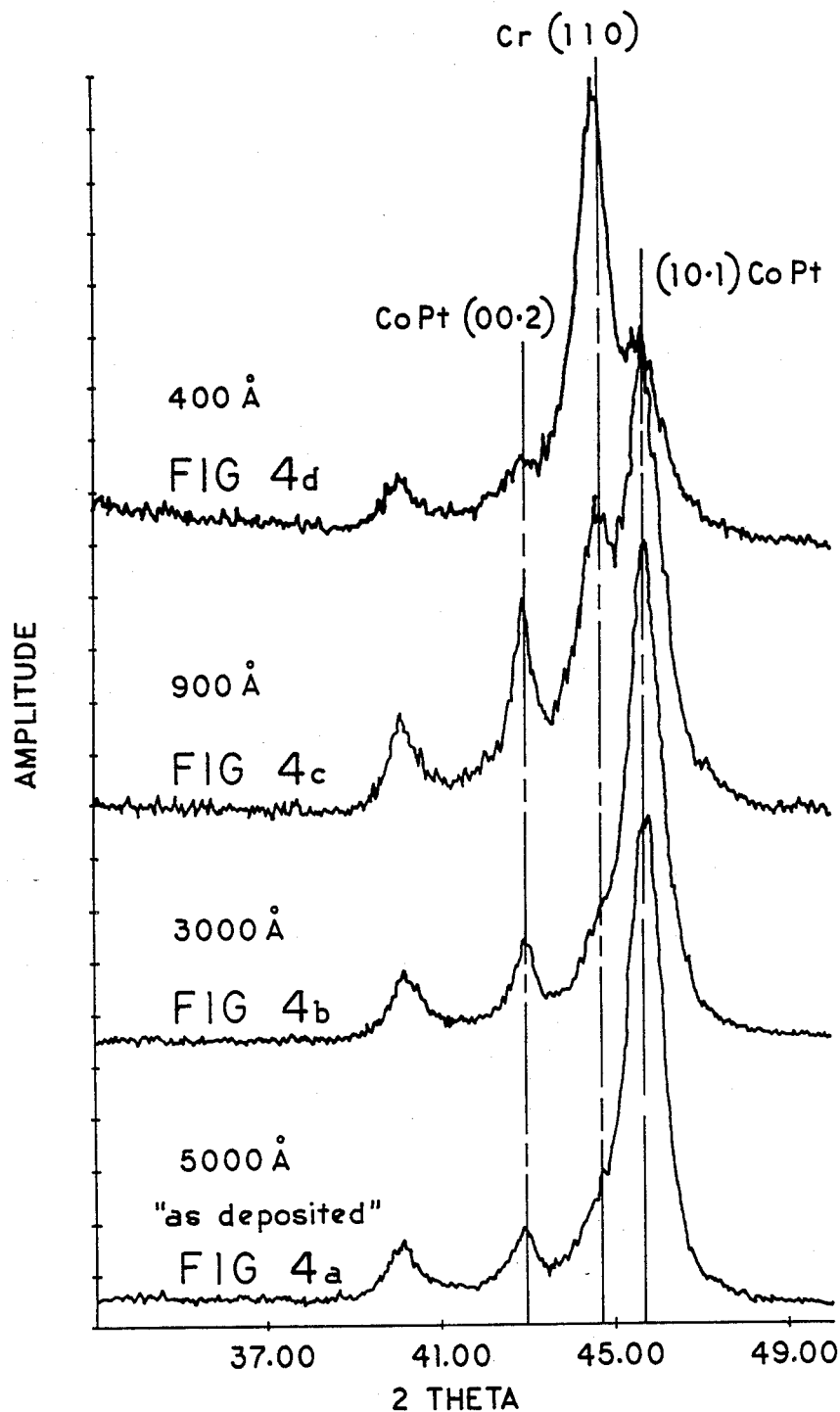
Figure 5:
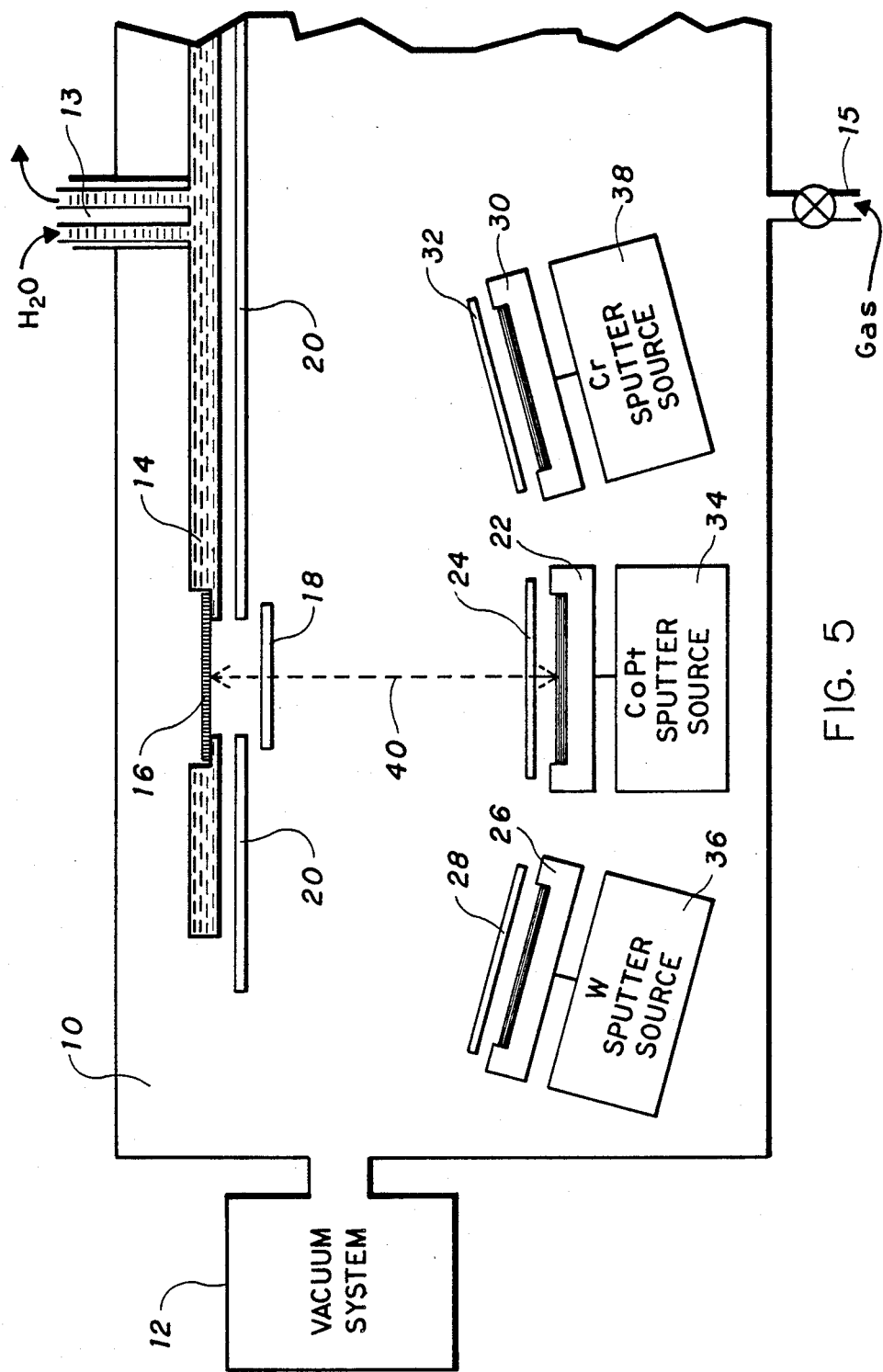

The invention will be described with respect to the figures, of which:

FIG. 1 illustrates a CoPt crystallite having its (10.1) plane parallel to a deposition plane and showing the crystallite's [00.2] and [10.1] directions, FIG. 2 is a plot of an X ray diffraction pattern of CoPt crystallites deposited with the orientation of FIG. 1, FIGS. 3a–3d are plots of X ray diffraction patterns at various thicknesses of a 10,000 angstrom thick film in accordance with the invention, FIGS. 4a–4d are plots of X ray diffraction patterns at various thicknesses of a 5,000 angstrom thick film in accordance with the invention, and FIG. 5 is a schematic representation of the deposition system of the invention.

The use of CoPt as a magnetic material for fabricating both bulk and deposited magnets is well known in the art. As deposited magnetic material, thin film CoPt has been utilized as a magnetic recording medium in magnetic disk recording applications, and as a permanent magnet in the biasing of a magnetoresistive head. For both longitudinal recording and permanent magnet applications, the desired CoPt film is a polycrystalline structure consisting of close packed hexagonal crystallites, whose C-axes lie either in the plane of the film or have an appreciable component lying in the plane of the film. It is known that the coercivity of the film is proportional to the amount of magnetic material so oriented; the C-axis substantially being the direction of the easy axis of magnetization of the crystallite.

It is known in the art that a crystallographic X ray diffraction pattern allows the determination of the orientation of a crystalline film sample. Referring to FIG. 1, the (10.1) plane of a close packed hexagonal CoPt crystallite is shown lying parallel to a substrate 16 reference surface. The (10.1) plane of a polycrystalline deposit of such crystallites on the substrate 16 lies in the plane of the film, and a strong (10.1) peak appears in the X ray diffraction pattern shown in FIG. 2. It is also known that the C-axis, having the [00.2] direction, is canted at approximately 29 degrees with respect to the (10.1) plane for the CoPt crystallite. The presence of the strong (10.1) reflection is thus indicative that the C-axis is positioned at about 29 degrees with respect to the film surface, and resultantly an appreciable component of the C-axis lies in the plane of the deposited CoPt film.

The methods of the prior art teach a wide variety of deposition techniques in fabrication of CoPt magnetic films. Among the controlled parameters are depositions with or without the use of a sublayer chosen from different materials atop the substrate, gas composition and pressure during deposition, composition of the CoPt sputtering targets, temperature of the substrate, biasing of the substrate and geometry of the deposition system. Combinations of the above parameters have yielded CoPt films of various characteristics, however, the CoPt films of the prior art have all exhibited the characteristic of decreasing coercivity with increasing film thickness. It is hypothesized, for the films of the prior art, that as the thickness of the film grows during deposition the C-axis, which initially has a component in the plane of the substrate, begins to rotate out of the plane of the film, with an attendant rapid decrease in the coercivity of the film.

U.S. Pat. No. 4,438,066 in the names of Aboaf et al discloses a CoPt deposited film, for use as a magnetic recording medium or as a hard axis biasing magnet for a magnetoresistive head, with coercivity decreasing from 2,000 to 700 oersted as the film thickness is increased from 300 to 500 angstroms. U.S. Pat. No. 4,631,202 in the names of Opfer et al, discloses the use of a CoPt layer of thickness from 125 to 1,000 angstroms over a sublayer of chromium (Cr), in which the magnetic properties are varied by control of the platinum content and the film thickness. U.S. Pat. No. 4,654,276 in the names of Ahlert et al disclose a thin film deposited CoPt layer over a tungsten (W) sublayer as a magnetic recording medium in which the coercivity drops from over 2,400 oersted to below 1,900 oersted as the CoPt layer thickness increases from 200 to 700 angstroms. U.S. Pat. No. 4,596,646 in the names of Kitada et al discloses a thin film deposited CoPt layer as a magnetic recording medium and as a permanent magnet for biasing a magnetoresistive element wherein the coercivity of the film is about 1,400 oersted at thicknesses below 1,000 angstrom, dropping to below 500 oersted when the thickness reaches 2,000 angstrom and above. Thus, it will be appreciated, useful prior art CoPt deposited films, as disclosed above, are characterized by thicknesses of from 100 to no greater than 3,000 angstroms, with their coercivities decreasing sharply with increasing thickness until the decreased coercivities render the films unsuitable for application as magnetic materials.

The decrease in coercivity with increasing thickness is particularly troublesome when the CoPt layer is to serve as a permanent magnet, for example, in the biasing of a magnetoresistive head. It is known in the art that the external field produced by a permanent magnet is proportional to the product of (BH)max and the volume of the magnet, where (BH)max is the maximum value of the "energy product, BH"; B being the magnetic induction and H the coercivity of the magnet. (See, "Introduction to Magnetic Materials", B. D. Cullity, Addison-Wesley Publishing Company, Reading, Massachusetts, 1972, pp. 560–561.) Attempts to increase the external magnetic field of a CoPt film known in the art by increasing the film thickness to provide increased volume is effectively defeated by the rapid decrease in magnet coercivity with the increasing film thickness. U.S. Pat. No. 4,596,646 suggests a solution to this problem by stacking deposited CoPt films of thickness 1,000–1,200 angstroms, separated by silicon dioxide insulating layers, to attain a magnet of requisite volume. The deposition method taught by the present invention attacks and solves the problem to provide a usable deposited CoPt magnet in thickness from 3,000 to 10,000 angstoms with a coercivity of from 1,300 to 2,000 oersteds as a single homogeneous structure.

SUMMARY OF THE INVENTION

The deposition method taught by the present invention provides for the controlled deposition of the hexagonal form of the CoPt crystalline structure so that the C-axis, or an appreciable component of the C-axis, lies in the plane of the film and substrate. The resultant film is characterized by this "in-plane" orientation of the C-axis throughout the thickness of the film, thereby giving rise to a film of enhanced coercivity within the entire volume of magnetic material. By practicing the teachings of the invention, the "in-plane" orientation of the C-axis is preserved even for film thicknesses up to 10,000 angstroms. When configured as a permanent magnet, the CoPt thick film of the invention provides the material for a homogeneous thick permanent magnet having a high coercivity, and due to the film's increased thickness a magnet volume sufficient to generate an external field suitable for biasing an adjacently deposited magnetoresistive element.

To fabricate the magnetic film of the invention, sputtering from a CoPt target in an inert gaseous atmosphere deposits CoPt onto a smooth substrate, such as silicon, aluminum oxide-titanium carbide, sapphire or ferrite, which may have a Cr or W overlayer previously deposited thereon. In the practice of the invention, the "throw distance", i.e. the distance from the sputtering target to the substrate, must be great enough so that at the gas pressure of deposition, the particles are "thermalized" before depositing on the substrate's overlayer. "Thermalization" is the process whereby the atoms of Co and Pt, which are emitted from the targets with energies approximately equal to about 5 electronvolts, undergo a sufficient number of collisions with the inert gas atoms as the depositing atoms traverse the "throw distance" to reduce the Co and Pt atoms' energies to the room temperature thermal energy of $3/2\ kT = 0.039$ electronvolts, where k is Boltzmann's constant, and T is room temperature in degrees Kelvin. It is believed that thermalization of the depositing atoms favors hexagonal crystalline CoPt deposition with an appreciable C-axis component in the plane of the film over the range of film thickness attained by practice of the invention.

DESCRIPTION OF THE INVENTION

Considering first the product of the invention, and referring now to FIGS. 3a-3d, a sequence of X-ray diffraction data is shown for a CoPt film, deposited on a Si substrate having a Cr overlayer in accordance with the invention, whose thickness is step-wise reduced by sequential ion milling operations. After each milling step, an X-ray diffraction pattern is obtained for the thinned-down remaining CoPt film. FIG. 3a is the pattern of the 10,000 angstrom thick film "as deposited", while FIG. 3b is the pattern after the film has been ion milled to have a remaining thickness of 8,000 angstroms, FIG. 3c after ion milling to leave a 6,000 angstroms thick film and FIG. 3d after ion milling to leave one of about 5,000 angstroms. In FIGS. 3a-3d, a strong (10.1) peak and a subsidiary (00.2) peak exist throughout the film from the original thickness of 10,000 angstroms to the final thickness of about 5,000 angstroms. The (10.1) peak, present at all the thickness levels, indicates that an appreciable component of the C-axis in the plane of the film exists throughout the above enumerated thickness profile of the film.

Similarly, FIGS. 4a-4d are equivalent X ray patterns of a film in accordance with the invention initially deposited on a Cr overlayer to a thickness of about 5,000 angstroms and then sequentially ion milled down to a thickness of 400 angstroms. FIG. 4a, the pattern of the "as deposited" 5,000 angstrom film shows a strong (10.1) peak and a subsidiary (00.2) peak, as does FIG. 4b for the film after milling to a thickness of 3,000 angstroms. FIG. 4c for the film at a thickness of 900 angstroms, and FIG. 4d for the thickness of 400 angstroms, show the CoPt (10.1) peak dominating the (00.2) peak, albeit the CoPt spectrum is distorted by the (110) line of the Cr overlayer, which now shows through due to the thinness of the residual CoPt film of FIGS. 4c and 4d.

From the above patterns, it will be appreciated that the CoPt film of the present invention is characterized by an appreciable component of the C-axis oriented in the plane of the film from the surface of the Cr overlayer on the substrate throughout the entire thickness profile of the film up to 10,000 angstroms. The "in-plane" C-axis components throughout the film maintain the film coercivity of about 2,000 oersteds, notwithstanding the factor of ten increase in film thickness when compared to films of equivalent coercivity known in the prior art.

In other embodiments of the invention, a thick CoPt film is deposited on a W overlayer with a resultant coercivity of 1,700 oersteds, or is deposited directly onto the substrate with a resultant coercivity of 1,300 oersteds.

Referring to FIG. 5, a vacuum sputtering deposition system for the practice of the invention comprises a vacuum chamber 10 and an associated standard helium cryopumped vacuum system 12. Vacuum system 12 also controls the flow of inert gas, e.g. one of the noble gases, to maintain a predetermined gas pressure within the chamber 10. A water cooled, rotatable "carousel" 14 which supports the substrate 16 upon which the film is deposited is mounted in the chamber 10, and the coolant 13 effectively maintains the substrate 16 at room temperature during deposition. The carousel 14 and the substrate are electrically grounded. A remotely operated shutter 18 uncovers the substrate 16 during the deposition process, and an aperture 20 is provided to restrict the region of deposition. Directly opposite the substrate 16, is a CoPt sputtering target 22 and its associated remotely operated shutter 24. Symmetrically positioned on either side of the CoPt target 22 are a W target 26 and its shutter 28, and a Cr target 30 and its shutter 32. Both the W target 26 and the Cr target 30 are aimed directly at the substrate 16. Associated with the CoPt target 22 is a 2" sputtering source 34, tradename "Plasmax 130", manufactured by L. M. Simard Inc. Santa Barbara, California, which operates as a d.c. triode magnetron source. Sputtering sources 36 and 38 used with the W target 26 and Cr target 30, respectively, are both the Model US Gun II d.c. magnetron source manufactured by US Inc, Campbell, Calif.

An important parameter of the deposition system used in the practice of the invention is the "throw distance", 40, i.e. the distance, represented by the dotted arrow, between CoPt target 22 and the substrate 16. This distance was 21.6 cm for the deposition of the disclosed films. The "throw distance" 40 is great enough to ensure the thermalization of the depositing Co and Pt atoms, i.e. reduction of particle energy to about 0.039 electronvolts through collision with the inert gas atoms before depositing on the substrate 16. In a preferred embodiment of the invention, the inert gas was argon (Ar) at a pressure, during the CoPt deposition, of 15 millitorr. Calculation shows that Co and Pt are fully thermalized at "throw distances" of 7.2 cm and 3 cm, respectively, at an Ar pressure of 15 millitorr.

EXAMPLE 1

A stationary 2" diameter thermally oxidized Si wafer mounted on the water cooled carousel 14 served as the substrate 16 for the deposited film. With shutters 18 and 32 open, an 1000 angstrom thick overlayer of Cr was first deposited at an Ar pressure of 3 millitorr from the Cr target 30 and the sputtering source 38 at target thickness dependent deposition rates of 58-88 angstrom per second. Without opening the vacuum system, the system was cleaned by pumping down and the Ar pressure was then increased to 15 millitorr. With the shutters 24 and 18 open, CoPt was deposited from the 80% Co, 20% Pt target 22 and sputtering source 34 at a deposition rate of 147-150 angstroms per minute, corrected for target thickness. A film of 10,000 angstroms of CoPt was deposited over the 1,000 angstrom Cr overlayer.

Ten sample CoPt films were fabricated in accordance with the above process, and the average values and tolerances of their physical and magnetic characteristics are as follows:

Thickness, t=10,000±1,000 angstroms
Saturation Magnetization, $4\pi M_s = 10.7 \pm 0.5$ Kilogauss
Coercivity, $H_c = 1880 \pm 150$ oersteds
Squareness, $S = 0.70 \pm 0.05$.

EXAMPLE 2

A 5,000 angstrom thick CoPt sample was deposited following the process set forth in Example 1 above.

The magnetic properties of the CoPt film were as follows:

Saturation Magnetization, $4\pi M_s = 10$ kilogauss
Coercivity, $H_c = 2,000$ oersteds
Squareness, $S = 0.7$

EXAMPLE 3

A 5,000 angstrom thick CoPt sample was deposited following the process set forth in Example 1 above, except the overlayer was a 1,000 angstrom layer of W instead of Cr. The W overlayer was deposited at a target rate of 64-102 angstroms per second, corrected for target thickness.

The magnetic properties of the CoPt film on the W overlayer were as follows:

Saturation Magnetization, $4\pi M_s = 10$ kilogauss
Coercivity, $H_c = 1570$ oersteds
Squareness, $S = 0.8$

EXAMPLE 4

A 5,000 angstrom thick CoPt sample was deposited following the process set forth in Example 1 above, except no overlayer was used.

The magnetic properties of the CoPt film deposited directly on the substrate were as follows:

Saturation Magnetization, $4\pi M_s = 11$ kilogauss
Coercivity, $H_c = 1300$ oersteds
Squareness, $S = 0.7$.

It will be appreciated that all the CoPt films of the invention as deposited are magnetically isotropic in the plane of the film. As is known in the art, to convert the film to a permanent magnet it is necessary to magnetize it by exposing it to a sufficiently strong external magnetic field. Because the magnetic easy axis of the polycrystalline CoPt is substantially in the plane of the film, an external field oriented in the plane of the film results in a magnetization lying in the plane of the magnet along the direction of the inducing external field.

The invention has been described in detail with particular reference to preferred embodiments thereof, but it will be understood that variations and modifications can be effected within the spirit and scope of the invention.

What is claimed is:

1. An improved planar magnetic film of deposited close packed hexagonal polycrystalline CoPt, said magnetic film comprising:
   a. a substrate,
   b. a Cr overlayer deposited on said substrate, and
   c. a CoPt film deposited on said Cr overlayer, said CoPt film having a thickness of from 3,000 to 10,000 angstroms, wherein throughout said thickness of said CoPt film, the C-axis of said polycrystalline CoPt lies substantially at an angle of 29 degrees with respect to the plane of said CoPt film.

2. The magnetic film of claim 1 having a coercivity substantially equal to 2,000 oersteds.

3. The magnetic film of claim 2 configured as a permanent magnet having a resultant magnetization lying in the plane of said magnet.

4. An improved planar magnetic film of deposited close packed hexagonal polycrystalline CoPt, said magnetic film comprising:
   a. a substrate,
   b. a W overlayer deposited on said substrate, and
   c. a CoPt film deposited on said W overlayer, said CoPt film having a thickness of from 3,000 to 10,000 angstroms, wherein throughout said thickness of said CoPt film, the C-axis of said polycrystalline CoPt lies substantially at an angle of 29 degrees with respect to the plane of said CoPt film.

5. The magnetic film of claim 4 having a coercivity substantially equal to 1,600 oersteds.

6. The magnetic film of claim 5 configured as a permanent magnet having a magnetization lying in the plane of said magnet.

7. An improved planar magnetic film of deposited close packed hexagonal polycrystalline CoPt, said magnet comprising:
   a. a substrate, and
   b. a CoPt film deposited on said substrate, said CoPt film having a thickness of from 3,000 to 10,000 angstroms, wherein throughout said thickness of said CoPt film, the C-axis of said polycrystalline CoPt lies substantially at an angle of 29 degrees relative to the plane of said CoPt film.

8. The magnetic film of claim 7 having a coercivity substantially equal to 1,300 oersteds.

9. The magnetic film of claim 8 configured as a permanent magnet having a magnetization lying in the plane of said magnet.

10. A method for depositing a magnetic film by use of deposition apparatus containing an inert atmosphere, said method comprising the steps of:
    a. sputtering an overlayer from a Cr or W target onto a substrate,
    b. sputtering a polycrystalline CoPt film from a CoPt target onto said overlayer to a thickness of from 3,000 to 10,000 angstroms, and
    c. thermalizing Co and Pt atoms sputtered from said CoPt target for deposition as said CoPt film by positioning said substrate relative to said CoPt target and setting the pressure of said inert atmosphere, wherein the thermal energies of said atoms are substantially reduced to 3/2 kT where k is Boltzmann's constant and T is substantially equal to room temperature in degrees Kelvin, and whereby the C-axis of said polycrystalline CoPt film lies substantially at an angle of 29 degrees with the plane of said film throughout said thickness of said CoPt film.

11. The method of claim 10 further comprising the step of magnetizing said magnetic film by means of an external magnetic field to configure said magnetic film as a permanent magnet, whereby the magnetization of said magnet lies in the plane of said magnet.

12. A method for depositing a planar magnetic film by use of deposition apparatus containing an inert atmosphere, said method comprising the steps of:

a. sputtering a polycrystalline CoPt film from a CoPt target onto a substrate to a thickness of from 3,000 to 10,000 angstroms, and b. thermalizing Co and Pt atoms sputtered from said target for deposition as said CoPt film by positioning said substrate relative to said CoPt target and setting the pressure of said inert atmosphere, wherein the thermal energies of said atoms are substantially reduced to 3/2 kT where k is Boltzmann's constant and T is substantially equal to room temperature in degrees Kelvin, and whereby the C-axis direction of said polycrystalline CoPt film lies substantially at an angle of 29 degrees with respect to the plane of said CoPt film throughout said thickness of said CoPt film.

13. The method of claim 12 further comprising the step of magnetizing said film by means of an external magnetic field to configure said film as a permanent magnet, whereby the magnetization of said magnet lies in the plane of said magnet.

* * * * *

UNITED STATES PATENT AND TRADEMARK OFFICE
CERTIFICATE OF CORRECTION

PATENT NO. : 4,902,583

DATED : February 20, 1990

INVENTOR(S) : Brucker et al.

It is certified that error appears in the above-identified patent and that said Letters Patent is hereby corrected as shown below:

Title page, item [73] Please add the Assignment line as follows:
   --EASTMAN KODAK COMPANY, Rochester, NY--

Title page, under "Primary Examiner—John J. Zimmerman" add the Attorney, Agent or Firm line as follows:
   --Attorney, Agent, or Firm—Daniel Robbins--

Signed and Sealed this

Thirtieth Day of April, 1991

*Attest:*

HARRY F. MANBECK, JR.

*Attesting Officer*   *Commissioner of Patents and Trademarks*